March 4, 1969 H. J. EDENS 3,430,580
VEHICLE AND SWITCH THEREFOR
Filed June 12, 1967 Sheet 1 of 3

INVENTOR.
HENDRIK JOHAN EDENS
BY Rogers, Bereskin, & Parr

March 4, 1969     H. J. EDENS     3,430,580
VEHICLE AND SWITCH THEREFOR
Filed June 12, 1967     Sheet 2 of 3
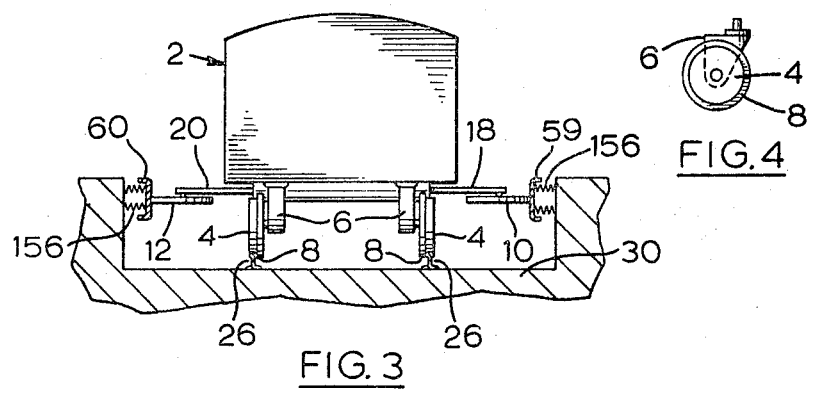
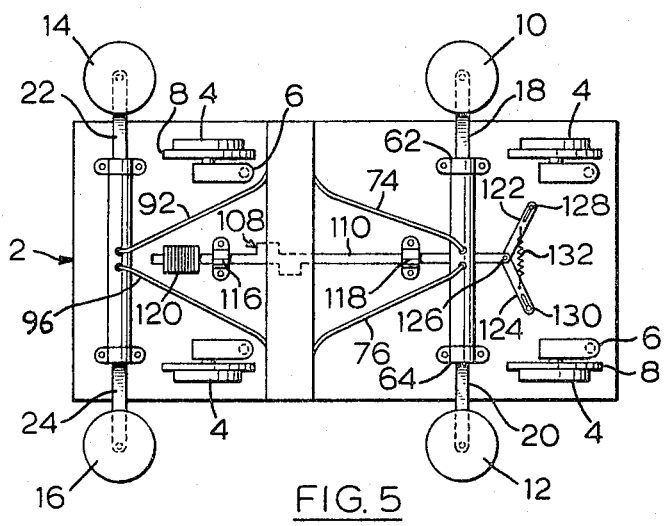
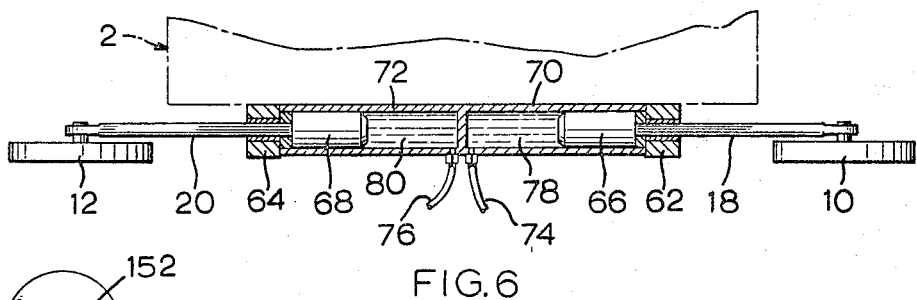
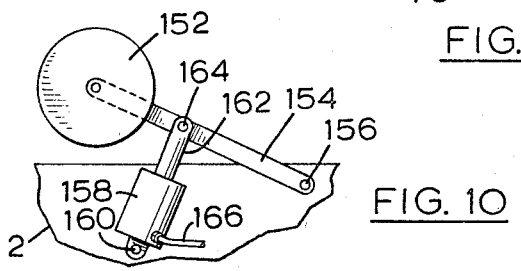
INVENTOR.
HENDRIK JOHAN EDENS
BY Rogers, Bereskin, & Parr March 4, 1969  H. J. EDENS  3,430,580
VEHICLE AND SWITCH THEREFOR
Filed June 12, 1967  Sheet 3 of 3
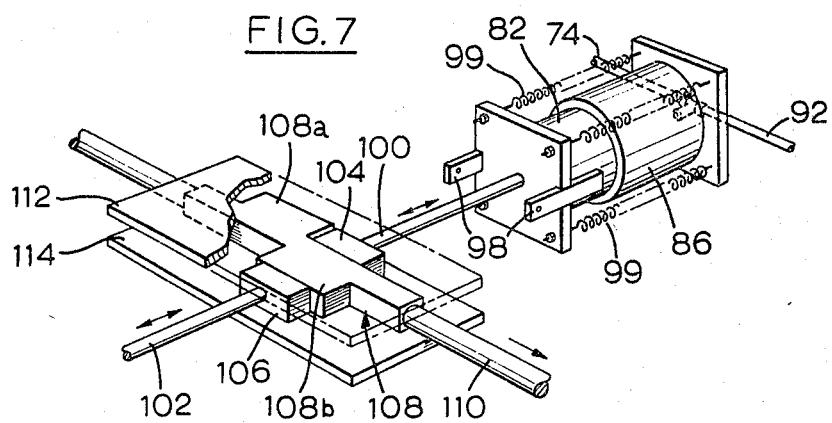
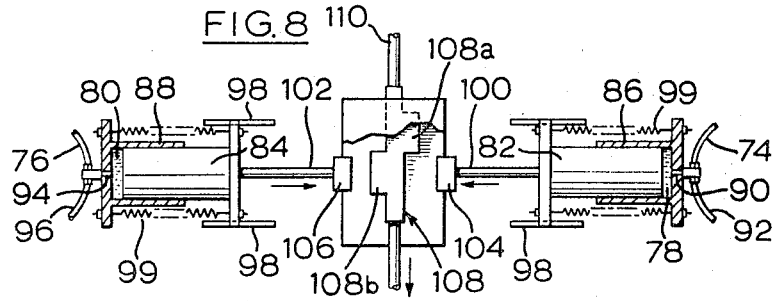
INVENTOR.
HENDRIK JOHAN EDENS
BY
Rogers, Bereskin, & Parr U.S. Patent Office
3,430,580
Patented Mar. 4, 1969

3,430,580
VEHICLE AND SWITCH THEREFOR
Hendrik Johan Edens, 1740 Pharmacy Ave.,
Agincourt, Ontario, Canada
Filed June 12, 1967, Ser. No. 645,201
Claims priority, application Canada, July 14, 1966,
965,386
U.S. Cl. 104—28                   12 Claims
Int. Cl. B61b 1/00; B61l 27/04, 23/00

ABSTRACT OF THE DISCLOSURE

A vehicle switching system in which a rail travelling vehicle, having four castor mounted support wheels, travels off the rails onto a flat roadbed in a switch. Converging side walls of the switch then push against side guide wheels of the vehicle to push the vehicle sideways as it progressed through the switch, until the support wheels align with one of two sets of exit rails at the exit end of the switch. The guide wheels compress inwardly to accommodate the converging side walls and may be locked in either of two blocking positions to control which exit rails the vehicle will be pushed into alignment with.

---

This invention relates to an improved switching arrangement for switching a vehicle between two switching paths.

In the past, guided vehicles, i.e., vehicles without any operator steering mechanism, have usually employed movable rail switches in order to switch their paths of travel. The common railway switch is a familiar example of such switches. Switches of this nature have the disadvantage that they can fail in a position intermediate their two switching positions, thus causing possible derailing of and damage to the guided vehicle. In addition, such a switching system does not readily lend itself to a rapid transit system employing large numbers of small vehicles travelling a number of different routes dependent upon the immediate desires of the passengers. In such a mass transit system, central programming of vehicle routings is desirable, but such programming in a system employing conventional switches is difficult since any central programming means employed must retain in memory the precise location, speed, and destination of every vehicle in the system, plus the configuration of each switch in the system.

Accordingly, the present invention concerns a switching system for a vehicle in which any necessary movement of parts in order to produce switching is accomplished solely in the vehicle itself. Systems employing this general concept have been attempted in the past, as shown for example in U.S. Patent 3,012,517, issued Dec. 12, 1961, to W. Gale. In a system such as that shown in the Gale patent, a system of guiding rails is provided, but the rails contain no moving parts. Instead, an auxiliary set of support wheels is extended depending on the routes desired. The disadvantage of this system is that, since the extra set of wheels must support the weight of the vehicle, the construction of the auxiliary support wheel mechanism must be extremely heavy and costly. In addition, a disadvantage of typical prior art systems such as that shown in the Gale patent is that the switching mechanism is not bistable, i.e., it can fail or stick in an intermediate position between its two switching positions, with potentially disastrous results.

Therefore, the present invention in one of its aspects provides a switching system in which the weight of the vehicle to be switched is supported on normal support wheels, and separate switchable guide means are provided for switching the vehicle, the guide means never being required to bear the weight of the vehicle. In addition, in one of its aspects, the present invention provides a bistable control system for the guide means by which the guide means may be locked in only two possible switching positions and cannot by reason of a power failure be locked in a position intermediate the switching positions. This reduces the possibility of failure of the switching mechanism half way through its operation.

These and other objects of the invention will appear from the following disclosure, taken together with the accompanying drawings, in which:

FIGURE 3 is a view taken along line 3—3 of FIGURE 1, showing the vehicle entering the switch and also showing support means for the guide walls of the switch;

FIGURE 4 illustrates the castor mounting for the support wheels of the vehicle;

FIGURE 5 is a plan view of the bottom of the vehicle;

FIGURE 6 is a sectional view showing mounting means for two of the guide wheels of the vehicle;

FIGURE 7 is a perspective view showing a portion of the blocking cylinder and piston arrangement for the guide wheel pistons, with blocking members forced into one of their blocking positions;

FIGURE 8 is a plan view showing the blocking piston and cylinder arrangement of FIG. 7 in an unblocked position (guide wheels fully extended);

FIGURE 9 shows actuating means for a solenoid shown in FIGS. 5 and 8;

FIGURE 10 shows a modified mounting arrangement for the guide wheels; and

FIGURE 11 shows a modified piston and cylinder arrangement for the guide wheels.

Figure 1:
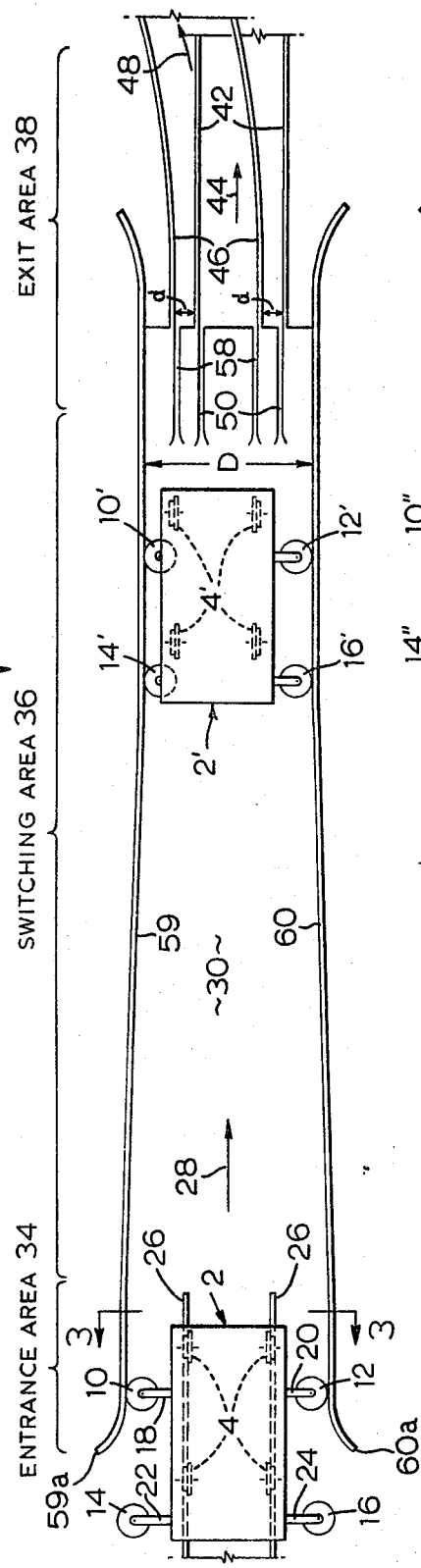
FIGURE 1 is a diagrammatic plan view of a switch according to the present invention, showing a vehicle entering the switch and another vehicle in a first switching position part way through the switch, the horizontal dimensions of the view being enlarged for a clearer understanding of the switching principles of the present invention.

Reference is first made to FIGURES 1 to 4, where the invention is illustrated in diagrammatic form. As shown, there is provided a relatively small, light vehicle 2 typically accommodating two to six passengers. The vehicle 2 includes four flanged support wheels 4, mounted on the vehicle by a caster mounting 6 (shown diagrammatically in FIG. 4), the flanges 8 of the support wheels 4 being capable of supporting the weight of the vehicle, for a purpose to be discussed shortly. The vehicle 2 also includes front guide wheels 10 and 12 and rear guide wheels 14 and 16. These guide wheels are supported on arms 18, 20, 22 and 24 respectively, for rotation of the guide wheels in a horizontal plane and for in and out movement of the guide wheels from the sides of the vehicle. Normally, the guide wheels are biased outwardly to an extended position such as that shown for vehicle 2 of FIG. 1.

Figure 2:
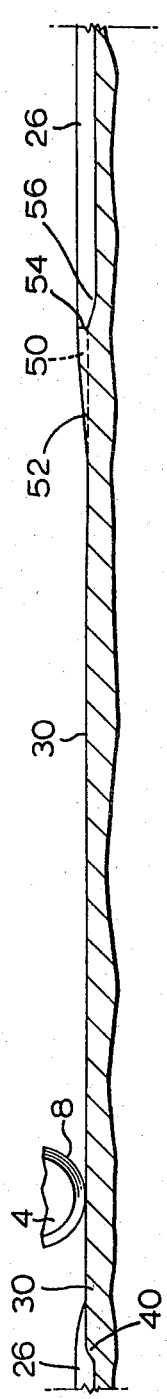
FIGURE 2 is a sectional view showing the roadbed and one of the rails of the switch of FIG. 1.

The support wheels 4 of the vehicle normally run on and are guided by rails 26, the vehicle thus normally moving along a path of travel such as that shown at 28 in FIGURE 1. The rails 26 are mounted in turn on a roadbed 30 (FIGS. 2 and 3).

The switch of the embodiment of the present invention selected for description is shown generally at 32 and includes an entrance area 34, a switching area 36 and an exit area 38. As shown, the rails 26 extend through the entrance area and then terminate, the roadbed 30 being raised (as at 40) just before the termination of the rails 26 so that when (as will be described) the vehicle 2 moves off the rails onto the roadbed, no bump will occur. Throughout the switching area 36, the support wheels run directly on the roadbed 30 and are supported by their flanges 8.

The exit area 38 of the switch includes a first set of rails 42 for carrying vehicles along a first switching path 44, and a second set of rails 46 for carrying vehicles along a second switching path 48. The rails 42 commence at transition grooves 50, the grooves 50 being formed in a smoothly sloped upward portion 52 of the roadbed 30. The rails 42 blend smoothly into this raised portion 52, the remainder of the raised portion then terminating as at 54 and the roadbed resuming its normal level at 56. The rails 46 commence at a similar pair of transition grooves 58, the rails 46 being separated from the rails 32 by a distance $d$. The distance $d$ will typically be 6 to 9 inches. In the embodiment illustrated, the rails 26 are aligned midway between the rails 42 and the rails 46.

The switch 32 also includes a pair of vertically aligned guide walls 59 and 60 commencing at points 59a and 60a, respectively. At points 59a, 60a the guide walls are separated by a distance greater than the maximum distance between the extremities of the guide wheels when the guide wheels are fully extended.

In the entrance area 34 of the switch, the guide wheels converge slightly (to engage and force the guide wheels slightly inwardly) and then, throughout the remainder of the entrance area 34, the guide walls 59, 60 run substantially parallel to the rails 26.

In the switching area the guide walls 59, 60 converge inwardly as shown, until they are separated by a distance D towards the end of the switching area 36, adjacent the exit area 38. Near the end of the switching area 36, the guide walls 59, 60 extend parallel to each other, into the exit area 38, and then diverge outwardly to terminate at a point spaced along the path of travel of the vehicle from the point of commencement of the rails 42 and 46.

Figure 1A:
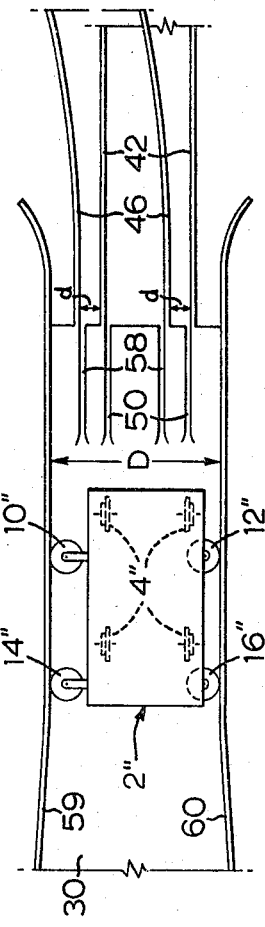
FIGURE 1A is a plan view showing a portion of the switch of FIGURE 1 with a vehicle in a second switching position part way through the switch.

As mentioned, the guide wheels 10, 12, 14 and 16 are normally biased outwardly to an extended position such as that shown for the vehicle 2 at the left hand side of FIG. 1, and are movable inwardly. However, only limited inward movement is possible, further inward movement then being blocked or prevented by a switching control mechanism, not yet shown and to be described presently. The switching control mechanism is capable of blocking inward movement of the guide wheels so that the guide wheels can assume one of two switching positions, a first switching position shown for vehicle 2' in FIGURE 1 and a second switching position shown for vehicle 2'' in FIGURE 1A. In the first switching position, shown for vehicle 2', the wheels 10' and 14' are blocked against further inward movement when they have moved inwardly to a greater extent than have wheels 12' and 16', the maximum inward movement of opposite guide wheels being such that the distance from the extremity of one guide wheel to the extremity of the opposite guide wheel is equal to the distance D.

In the second switching position shown for vehicle 2'', the guide wheels 12'' and 16'' are permitted to move inwardly to a greater extent than wheels 10'' and 14'' before being blocked, opposite guide wheels being blocked when the distance getween their extremities is distance D.

The operation of the switching system of FIGURES 1 to 4 is as follows. Assume that a vehicle travelling along rails 26 is to be directed along rails 46. In that case, the switching control mechanism of the vehicle is set to block inward movement of the guide wheels after they have reached their first switching position (shown for vehicle 2' of FIG. 1), i.e. after the wheels 10', 14' have moved inwardly to a greater extent than wheels 12', 16'. This setting of the switching control mechanism is effected before the vehicle enters the switch. When the vehicle moves into the entrance area 34 of the switch, the guide walls 59, 60 engage the guide wheels of the vehicle and force them slightly inwardly, but the guide wheels are not at this point forced inwardly to an extent sufficient to reach their switching or blocked position.

As the vehicle moves past the entrance area 34, the support wheels 4' begin to roll on the roadbed 30 and normal guidance for the support wheels disappears. However, the castor mounting of the support wheels maintains their alignment in the direction of motion of the vehicle (while permitting changes in such direction of motion, as will next be described) and prevents random swivelling of the support wheels.

As the vehicle travels through the switching area 36, the inwardly converging walls 59, 60 press the guide wheels further inwardly. The guide wheels 12', 16' soon reach their blocked position and can travel inwardly no further, so that the pressure of guide wall 60 on these guide wheels forces the vehicle bodily toward the guide wall 59. The castor mounted support wheels 4' will turn or swivel through a small angle to facilitate this sideways movement of the vehicle. The wheels 10', 14', being capable of further inward movement at this point, do not prevent such transverse movement of the vehicle 2'. The blocking position of the wheels 10', 14' and 12', 16' is set so that toward the end of the switching section 36 the vehicle 2' is travelling with its support wheels 4' aligned with the rails 46. The support wheels of the vehicle 2' then enter the transition grooves 58 and then commence running on the rails 46, switching of the vehicle to the rails 46 now having been accomplished.

Assume next that a vehicle entering the switch is to be directed onto rails 42. In that case, the control mechanism is set to block inward movement of the guide wheels after they have reached their second switching position (shown for vehicle 2'' in FIG. 1A), i.e., the wheels 12'', 16'' are permitted to move inwardly to a greater extent than the wheels 10'', 14''. In this situation, as the vehicle enters the switching area 34 of the switch, the pressure of the guide wall 59 on wheels 10'', 14'' will force the vehicle bodily toward guide wall 60, so that toward the end of the switching area 36 the vehicle 2'' will be aligned with its support wheels 4'' in line with the transition grooves 50 and rails 42. Any movement of the vehicle 2'' past a position of alignment with the grooves 50 is prevented by the guide wheels 12'', 16''. The vehicle then moves on to the rails 42 and the guide walls 59, 60 terminate, permitting the guide wheels to move outwardly again to the position shown for vehicle 2.

The switching section 36 of the switch will normally be relatively long, depending of course on the speed of the vehicle, to provide a smooth transverse shifting of the vehicle to either of its switching alignments. The distance $d$ between the rails 42 and 46 is, as mentioned, only 6 to 9 inches, and since the rails 26 are, as mentioned, aligned midway between the rails 42 and 46, the vehicle need move only 3 to 4½ inches sideways to reach alignment with either set of rails 42 or 46. This distance is so slight that the time for the transverse movement can be reduced to as little as a few seconds without an appreciable jolt.

Reference is next made to FIGURES 5 to 9 which show, somewhat diagrammatically, a typical mounting and control mechanism for the guide wheels. The mounting and control mechanism for the guide wheels 10 and 12 will first be described, the mechanism for the other pair of guide wheels being identical in form.

As shown in FIGS. 5 and 6, the arms 18 and 20 supporting guide wheels 10 and 12 are journaled in sliding bearings 62 and 64 respectively, connected to the frame of the vehicle 2. The arms 18, 20 (and 22, 24) are of square cross-section, to prevent their rotation in their supporting bearings, thus to maintain alignment of the guide wheels in a horizontal plane. To the arms 18 and 20 are connected pistons 66 and 68 respectively, moving in opposing cylinders 70 and 72, respectively. The head of the cylinder 70 contains an oil line 74 leading to a blocking cylinder device next to be described, while the head of the cylinder 72 contains a similar oil line 76 also leading to the blocking cylinder device. The space between the piston 66 and the head of cylinder 70, and the oil line 74, is filled with oil 78, while the corresponding space between the other piston 68 and cylinder 72 is filled with oil 80.

The blocking cylinder device, best shown in FIGURES 7 and 8, comprises a pair of opposed pistons 82 and 84 sliding in cylinders 86 and 88 respectively connected to the frame of the vehicle 2. In the head of cylinder 86 is an aperture 90 to which is connected the oil line 74 from cylinder 70 of guide wheel 10, and to which is also connected a similar oil line 92 from the cylinder (not shown) of guide wheel 14. Similarly, in the head of cylinder 88 is an aperture 94 to which is connected the oil line 76 from the cylinder 72 of guide wheel 12, and to which is also connected a similar oil line 96 from the guide wheel 16. Guide strips 98 are provided to assist in guiding the pistons 82, 84 in their travel, the strips 98 being fastened to the frame of the vehicle 2 by suitable means not shown. Tension springs 99 bias the respective pistons 82, 84 into their cylinders 86, 88, i.e., to the position shown in FIG. 8.

The pistons 82 and 84 carry rods 100 and 102 respectively, these rods terminating in blocks 104 and 106 respectively. The blocks 104 and 106 are aligned for abutment against a key 108 carried by a shaft 110, the key 108 having blocking portions 108a and 108b. When the key 108 is in the position shown in FIGS. 7 and 8, motion of the piston 84 toward the key is blocked before motion of piston 82 toward the key, while when the key 108 is shifted in the direction of the arrow so that blocking section 108a is in line with blocks 104 and 106, the situation is reversed, travel of piston 82 toward the key then being blocked before travel of piston 84. Upper and lower guide plates 112 and 114 are provided to assist in guiding the blocks 104 and 106 and the key 108 in their travel.

Referring to FIGURE 5, the shaft 110 is journaled in bearings 116 and 118 and is moved back and forth by solenoid 120. At one of its ends, the shaft 110 is connected to an over-the-center toggle linkage diagrammatically indicated as consisting of two rods 122 and 124 pivotally connected at 126 to the shaft 110 and slidably and pivotally mounted at 128 and 130 to the frame of the vehicle 2. A heavy spring 132 interconnects the two rods 122 and 124 to bias the shaft 110 so that it assumes either the position of FIGS. 5, 7 and 8 (blocking portion 108b in line with blocks 104, 106) or a position displaced to the right of the position shown in these figures (i.e., blocking portion 108a in line with blocks 104, 106) but not a central position between these two positions.

The operation of the mechanism illustrated in FIGS. 5 and 8 is as follows. Before the vehicle 2 enters the switch, the tension springs 99 pull the respective pistons 82, 84 towards the heads of their cylinders 86, 88. This is the situation shown in FIGURE 8. This forces the oil 78 between piston 82 and cylinder 86, for example, through oil line 74, thus pushing piston 66 (FIG. 6) outwardly in its cylinder 70 and moving guide wheel 10 to the extended position shown for vehicle 2 in FIGURES 1 and 5. Guide wheel 14 is similarly moved out by the pressure in oil line 92, while guide wheels 12 and 16 are moved outwardly by the pressure in oil lines 76 and 96. This position for the guide wheels is shown in FIG. 5.

Assume that it is desired to switch the vehicle to rails 46 (as shown for vehicle 2' in FIG. 1). In that case, before the vehicle enters the switch, the solenoid 120 is actuated, if necessary, to place the key 98 in the position shown in FIGS. 3 to 8, so that the section 108b of the key 108 will be placed between the blocks 104 and 106. Since the blocks 104 and 108 are retracted at this time by virtue of the tension of the springs 99, as shown in FIG. 8, they do not interfere with the movement of the key 108. When the vehicle enters the switch 32 and the guide walls 58, 59 begin to converge, the guide wheels are forced inwardly. Considering guide wheel 10 for example, the oil 78 (FIG. 6) between piston 66 and cylinder 70 is forced through oil line 74 into the space between piston 82 and cylinder 86 (FIGS. 7 and 8) thus forcing piston 82 out of its cylinder. When the block 104 engages the section 108b of the key 108, further movement of the piston 82 out of its cylinder is blocked and therefore further inward movement of guide wheel 10 is blocked. Since the piston and cylinder for guide wheel 14 are connected through oil line 92 to the same piston and cylinder 82 and 86, further inward movement of guide wheel 14 is also blocked at this time.

Similarly, movement of piston 84 out of its cylinder 88 is blocked when the block 106 engages the section 108b of the key 108, but this occurs after piston 88 has moved to a lesser extent than has piston 82 and therefore inward movement of guide wheels 12 and 16 is blocked after they have travelled inwardly to a lesser extent from have guide wheels 10 and 14. This situation, in which further movement of blocks 104 and 106 is prevented, is shown in FIG. 7. The dimensions of the guide wheel mounting pistons and cylinders, the pistons 82 and 84 and cylinders 86 and 88, the shafts and blocks 100, 102, 104, 106, and the key 108 are selected such that inward movement of opposite guide wheels is blocked when the outer extremities of the guide wheels are separated by the distance D and when the guide wheels on each side of the vehicle have moved inwardly to an extent such that the support wheels 4 of the vehicle are aligned with transition grooves 58 and consequently with rails 46, as shown for vehicle 2' of FIGURE 1.

If the vehicle is to be switched to rails 42 instead of to rails 46, then, before the vehicle enters the switch, solenoid 102 is energized to move shaft 110 so that section 108a of the key 108 is positioned between the blocks 104 and 106. In that case, inward movement of guide wheels 10 and 14 will be blocked before inward movement of guide wheels 12 and 16, so that the vehicle will be pushed laterally by guide walls 59, 60 until its support wheels are aligned with transition grooves 50 of rails 42, as shown for vehicle 2" of FIGURE 1A.

No specific propulsion means have been illustrated for the vehicle 2, since the particular method of propulsion used is not pertinent to the present invention. The vehicle may be self propelled, either by a self contained motor (internal combustion or electric) or may be powered by means such as a linear electric motor. In the latter case, the vehicle would most conveniently coast through the switch. Alternatively, the vehicle 2 may be carried along a conveyer belt, the vehicle engaging the conveyer belt in any suitable manner. In such event, it may be necessary to incline the rails 42, 46 upwardly in the exit area of the switch, in order to lift the vehicle to an extent sufficient to disengage it from its conveyer belt, so that it may then engage another conveyer belt.

The program of operation for the solenoid 120, which controls the switching of the vehicle, may be determined as follows. Passengers will board vehicles at stations, and each station will have a controller (not shown) which stores all programs for that station. A passenger will dial his desired destination into the station controller, and the controller will indicate to the passenger which vehicle the passenger is to board. At the same time, the station controller will feed an appropriate program into memory storage means, e.g., a magnetic tape, on the selected vehicle. The circuit from the controller to the vehicle may conveniently be through the rails 26, the rails being blocked off at station locations into insulated sections, one section for each vehicle.

The program placed on the tape memory of the selected vehicle will contain instructions to operate or not to operate the solenoid 120. Every time the vehicle passes through a switch, the tape will be moved up one position and an instruction will be read off either to move the blocking key 108 to a position opposite the position it is in, or to leave the blocking key 108 in its existing position. The vehicle will then go through the prescribed sequence of switching maneuvers and will arrive at the desired destination. In this way, the vehicle memory need store only one program at a time. In addition, no detectors at the wayside switches need be provided to actuate the tape control, since at each switch the horizontal guide wheels will be forced inwardly and such inward movement can be used as a control to advance the recorded memory. FIGURE 9 illustrates diagrammatically such a memory advance system.

As shown in FIG. 9, there is provided a microswitch 134 having a movable switch element 136. The microswitch 134 is mounted on a guide strip 98 of piston 82, so that each time the piston 82 moves a short distance out of its cylinder 98, toward either of its blocked positions (indicating that the vehicle is passing through a switch), the switch element 136 is depressed and an impulse is sent along a line 138 to delay means 140. The delay means 140 (provided to prevent operation of the solenoid 120 while the vehicle is moving through a switch) includes means operative only after depression and then release of element 136 then to apply a pulse to switching program advance means 142. The program advance means 142 then advances the program in a program storage unit 144 by one step; a program reader 146 reads the new instruction presented to it, and transmits if necessary a signal to a solenoid control unit 148 for the latter to actuate the solenoid 120. If no change is to be made in the position of the blocking key 108, then no pulse is provided by the program reader 146.

As will be appreciated, the means for blocking inward movement of the guide wheels is a bistable device, i.e., there are only two stable blocker or switching positions for the horizontal guide wheels. The switching positions are as shown for vehicles 2' and 2" in FIGURE 1. This is because the key 108 can, by reason of the over-the-center toggle linkage shown diagrammatically in FIGURE 5, assume only two stable positions, one position in which section 108a is placed in line with blocks 104 and 106, and another position in which section 108b is placed in line between blocks 104 and 106. Therefore, should the power to the switching mechanism fail, the switching mechanism will not fail in an intermediate position that might derail the vehicle.

If desired, the rails 42, for example, may be placed in line with the rails 26, so that if the vehicle is to be switched from rails 26 to rails 42, no lateral shifting of the vehicle will occur, but such shifting will occur only when the vehicle is to be switched to rails 46. Switches of this type may be included in the same system with switches in which lateral shifting always occurs when the vehicle passes through a switch, no changes being necessary in the vehicle itself but only in the positioning of the guide walls 58, 60 and in the position of the rails 42 and 46.

It will be realized that numerous modifications may be made in the system described. For example, instead of having flanged support wheels 4 running on rails 26, a different type of means may be used normally to support and guide the vehicle, for example a monorail arrangement. The same principle of horizontal guide wheels to shift the vehicle transversely at switch locations will still be applicable, provided that the normal support and guide means for the vehicle is modified at switch locations so that it only supports and does not guide the vehicle at switch locations.

Further, instead of the guide wheels 10, 12, 14, 16 being mounted as shown, they may be mounted on arms that swing out from the sides of the vehicle, so long as the guide wheels have a substantial component of motion in a direction at right angles to the path of travel of the vehicle. Such an arrangement is shown in FIG. 10, where a guide wheel 152 is shown mounted on an arm 154 pivotally attached to the vehicle at 156. A cylinder 158 is pivotally mounted on the vehicle at 160 and contains a piston rod 162 pivotally connected at 164 to the arm 152 to push the arm outwardly. An oil line 166 runs from the cylinder and corresponds to oil line 74, to carry oil to and from the central blocking cylinder and piston arrangement, which may remain unchanged.

It may be desirable to provide two separate oil systems in the control system shown in FIGS. 5 to 9, for added safety. This can be achieved by providing four cylinders and pistons in place of each cylinder and piston shown in FIGS. 5 to 9, a typical cross-section of the cylinders and pistons used to replace piston 66 and cylinder 70 being shown in FIG. 11. In the FIG. 11 embodiment, a cylinder 66' is provided having four separate cylinder apertures 168a, 168b, 170a, 170b, in which are fitted four pistons, not shown, connected to the guide wheel 10. The heads of the cylinders 168a and 168b are connected to an oil line 74a, while the heads of cylinders 170a, and 170b are connected to another oil line 74b. The oil lines 74a and 74b are connected to a similar four piston, four cylinder arrangement replacing the single piston and cylinder set 82, 86 of FIG. 8. A similar arrangement is adopted for the other pistons and cylinders for the other guide wheels. In this way, failure or leakage in one of the oil systems will not cause malfunction of the switching system. Alternatively, an entirely mechanical system could be adopted, with opposing guide wheels 10 and 12 mounted on shafts having blocking members such as blocks 104, 106 at their ends, the shaft 110 carrying two keys such as key 108, one key for the guide wheels 10 and 12 and the other key for guide wheels 14 and 16, motion of the shaft 110 repositioning both keys at the same time.

Some shock absorbing means may be provided in the side guide walls 59, 60 to cushion the shock as the guide walls converge and push the vehicle laterally. In the embodiment shown, springs 156 are provided (FIG. 3). These springs will, of course, be relatively stiff, particularly toward the exit and of the switching area, where accurate alignment of the vehicle is necessary. In addition, shock absorbing means may be provided in the mountings of the guide wheels themselves.

It will be appreciated that it is not necessary for both pairs of support wheels 4 of vehicle 2 to be castor mounted. For example, the rear wheels could be fixed and only the front pair castor mounted. The term castor mounting, as here used, means any wheel mounting in which the wheel may swivel but is biased by the weight or motion or both of the vehicle so that the wheel will tend to maintain its alignment in the direction of motion of the vehicle.

Finally, the guide wheels 10, 12, 14, 16 may if desired be replaced by guide shoes. In fact, instead of the guide wheels and guide walls illustrated, other switchable guide means on the vehicle cooperating with fixed guide means on the switch may be provided to force the vehicle laterally of its path of travel while the vehicle is in the switching area. For example, a pair of raised laterally spaced longitudinally extending slots in the roadbed could be provided, cooperating with a pair of vertically movable guide wheels on the underside of the vehicle, so that if one switching path were desired, one such vertically movable guide wheel (or peg) would be lowered and would engage its cooperating slot to force the vehicle laterally to a position in alignment with one set of exit rails. If the other switching path were desired, the other vertically movable guide wheel would be lowered to engage its cooperating slot thus to force the vehicle laterally to a position in alignment with the other set of exit rails. The same hydraulic means previously illustrated can be used to ensure that one vertically movable guide wheel or the other is always lowered.

What I claim as my invention is:
1. A switching system for switching a vehicle between two paths, comprising:
(a) a vehicle having
(1) support wheels for supporting and for normally guiding said vehicle along a path of travel,
(2) a pair of guide wheels,
(3) means mounting said guide wheels oppositely, one at each side of said vehicle, for rotation in a substantially horizontal plane and for movement bodily inwardly and outwardly in a direction having a substantial component transverse to said path of travel,
(4) control means selectively operable for blocking inward movement of said guide wheels beyond one of a first switching position in which one of said guide wheels is moved further inwardly than the other and a second switching position in which said other guide wheel is moved further inwardly than said one guide wheel,
(b) a switch having an entrance area, a switching area positioned along said path of travel from said entrance area, and an exit area positioned along said path of travel from said switching area, said switch comprising
(1) switch approach guide means in said entrance area and for cooperation with said support wheels, to support and guide said support wheels and hence said vehicle into said switch,
(2) first switch exit guide means in said exit area for cooperation with said support wheels, to support and guide said support wheels out of said switch along a first switching path,
(3) second switch exit guide means in said exit area and for cooperation with said support wheels, to support and guide said support wheels out of said switch along a second switching path, said second switch exit guide means being spaced laterally of said path of travel from said first switch exit guide means,
(4) support means in said switching area and for cooperation with said support wheels, to support said support wheels between said entrance and exit areas while leaving said support wheels substantially unguided, thus permitting movement of said vehicle in a direction transverse to said path of travel in said switching area,
(5) and fixed guide means in said switching area and for cooperation with said guide wheels, for forcing said guide wheels inwardly into one of their switching positions as said vehicle travels along said path of travel, for forcing said vehicle laterally of said path of travel into a position in which said support wheels will engage one of said switch exit guide means when said guide wheels are in said first switching position and will engage the other of said switch exit guide means when said guide wheels are in said second switching position.

2. A system according to claim 1 wherein said guide wheels are biased outwardly to a position in which they are separated by a first distance, and said guide wheels when in said first and second switching positions are separated by a second distance, said fixed guide means comprises a pair of guide members having substantially vertical guide surfaces, said guide surfaces being separated by a distance at least as great as said first distance at the end of said switching area adjacent to entrance area and converging to a separation substantially equal to said second distance at the end of said switching area adjacent said exit area, said guide surfaces forcing said guide wheels inwardly as said vehicle passes through said switching area, inward movement of said guide wheels beyond a said switching position being blocked by said control means, pressure of said guide surfaces on said guide wheels forcing said vehicle laterally of said path of travel until said supporting wheels are aligned with one of said switch exit guide means.

3. A system according to claim 2 wherein said support wheels are flanged wheels having rims of strength sufficient to carry said vehicle, said switch approach guide means comprises a first set of rails for supporting and guiding said support wheels, said first and second switch exit guide means comprise second and third pairs of rails respectively similar to first pair of rails, respective rails of said second and third pair of rails being spaced apart laterally by a distance equal to the distance measured transverse to said path of travel between said first and second switching positions of said guide wheels, and said switching area comprises a flat road bed for supporting said support wheels between said entrance area and exit area while leaving said support wheels unguided.

4. A system according to claim 3 wherein said support wheels are pivotally mounted on said vehicle by a castor mounting, to permit swivelling of said support wheels and to maintain said support wheels aligned in the direction of movement of said vehicle in said central area.

5. A system according to claim 4 wherein said vehicle includes a second pair of oppositely mounted guide wheels similar to said first pair, said first mentioned pair of guide wheels being mounted near one end of said vehicle and said second pair of guide wheels being mounted near the other end of said vehicle.

6. A system according to claim 1 wherein
(c) said means (a)(3) comprises a pair of arms, and means mounting said arms for inward and outward movement from the sides of said vehicle,
(d) and said control means (a)(4) comprises
(1) a pair of blocking members, and means coupling said blocking members to respective ones of said arms for movement therewith,
(2) stop means cooperating with said blocking members and having a first stop portion and a second stop portion,
(3) means mounting said stop means for movement from a first stop position in which said first stop portion engages said blocking members in a position to block inward movement of said guide wheels beyond said first switching position, through a central position to a second stop position in which said second stop portion engages said blocking members in a position to block inward movement of said guide wheels beyond said second switching position, and from said second stop position back through said central position to said first stop position,
(4) actuating means for moving said stop means between its first and second stop positions,
(5) and means biasing said stop means to its first stop position when said stop means is between its central position and its first stop position and biasing said stop means to its second stop position when said stop means is between its central position and its second stop position, thus to reduce the likelihood of said guide wheels being blocked in an intermediate position between said first and second switching positions.

7. A system according to claim 6 and for use with a recorded switching program, said vehicle including means for enabling said actuating means comprising: means for reading said program, means for advancing said program step by step past said reading means, means coupled to said reading means and to said actuating means and responsive to indications read from said program by said reading means to operate said actuating means to move said stop means, and means responsive to inward movement of said guide wheels for operating said advancing means.

8. A system according to claim 7 wherein said means for enabling said actuating means includes delay means for preventing each operation of said actuating means until after said vehicle has passed through said switch.

9. A vehicle having
   (a) support wheels for cooperation with supporting and guiding means, said support wheels supporting and normally guiding said vehicle along a path of travel,
   (b) a pair of guide wheels, for cooperation with guide means,
   (c) means mounting said guide wheels oppositely, one at each side of said vehicle, for rotation in a substantially horizontal plane and for movement bodily inwardly and outwardly in a direction having a substantial component transverse to said path of travel,
   (d) and control means selectively operable for blocking inward movement of said guide wheels beyond one of a first switching position in which one of said guide wheels is moved further inwardly than the other guide wheel and a second switching position in which said other guide wheel is moved further inwardly than said one guide wheel,
   whereby to permit support and guidance of said support wheels and hence of said vehicle along said path of travel by said supporting and guiding means, and also to permit support of said support wheels by support means while leaving said support wheels substantially unguided, thus permitting guidance of said vehicle by said guide means acting on said guide wheels and thereby permitting movement of said vehicle laterally of said path of travel.

10. A vehicle according to claim 9 wherein said support wheels are pivotally mounted on said vehicle by a castor mounting, to permit swivelling of said support wheels and to maintain said support wheels aligned in the direction of movement of said vehicle when said support wheels are supported by said support means rather than by said supporting and guiding means.

11. A switching system for switching a vehicle between two paths, comprising:
    (a) a vehicle having
       (1) support wheels for supporting and for normally guiding said vehicle along a path of travel,
       (2) switchable guide means operable between a first switching position and a second switching position,
    (b) a switch having an entrance area, a switching area positioned along said path of travel from said entrance area, and an exit area positioned along said path of travel from said switching area, said switch comprising
       (1) switch approach guide means in said entrance area and for cooperation with said support wheels, to support and guide said support wheels and hence said vehicle into said switch,
       (2) first switch exit guide means in said exit area for cooperation with said support wheels, to support and guide said support wheels out of said switch along a first switching path,
       (3) second switch exit guide means in said exit area and for cooperation with said support wheels, to support and guide said support wheels out of said switch along a second switching path, said second switch exit guide means being spaced laterally of said path of travel from said first switch exit guide means,
       (4) support means in said switching area and for cooperation with said support wheels, to support said support wheels between said entrance and exit areas while leaving said support wheels substantially unguided, thus permitting movement of said vehicle in a direction transverse to said path of travel in said switching area,
       (5) and fixed guide means in said switching area and for cooperation with said switchable guide means for forcing said vehicle laterally of said path of travel into a position in which said support wheels will engage one of said switch exit guide means when said switchable guide means is in its first switching condition and will engage the other of said switch exit guide means when said switchable guide means is in its other switching condition.

12. A switch for use with a vehicle having support wheels for supporting and for normally guiding said vehicle along a path of travel, said switch having an entrance area, a switching area positioned along said path of travel from said entrance area, and an exit area positioned along said path of travel from said switching area, said switch further including
    (a) switch approach guide means in said entrance area and for cooperation with said support wheels, to support and guide said support wheels and hence said vehicle into said switch,
    (b) first switch exit guide means in said exit area and for cooperation with said support wheels, to support and guide said support wheels out of said switch along a first switching path,
    (c) second switch exit guide means in said exit area and for cooperation with said support wheels, to support and guide said support wheels out of said switch along a second switching path, said second switch exit guide means being spaced laterally of said path of travel from said first switch exit guide means,
    (d) support means in said switching area and for cooperation with said support wheels, to support said support wheels between said entrance and exit areas while leaving said support wheels unguided, thus permitting movement of said vehicle in a direction transverse to said path of travel in said switching area,
    (e) and fixed guide means in said central area, for forcing said vehicle laterally of said path of travel into a position in which said support wheels will engage one of said first and second switch exit guide means depending upon the configuration of said vehicle.

References Cited

UNITED STATES PATENTS 3,012,517  12/1961  Gale _____ 104—28
3,349,719  10/1967  Young _____ 104—91

ARTHUR L. LA POINT, *Primary Examiner.*

DANIEL F. WORTH III, *Assistant Examiner.*

U.S. Cl. X.R.

104—88, 89, 91, 96